Feb. 5, 1935.  R. L. BEERS  1,989,661
STOKER MECHANISM
Filed July 30, 1932   5 Sheets-Sheet 1

Inventor
Royce L. Beers
By Whittemore Hulbert Whittemore & Belknap
Attorneys

Feb. 5, 1935.  R. L. BEERS  1,989,661
STOKER MECHANISM
Filed July 30, 1932   5 Sheets-Sheet 2

Inventor
Royce L. Beers
By
Attorneys

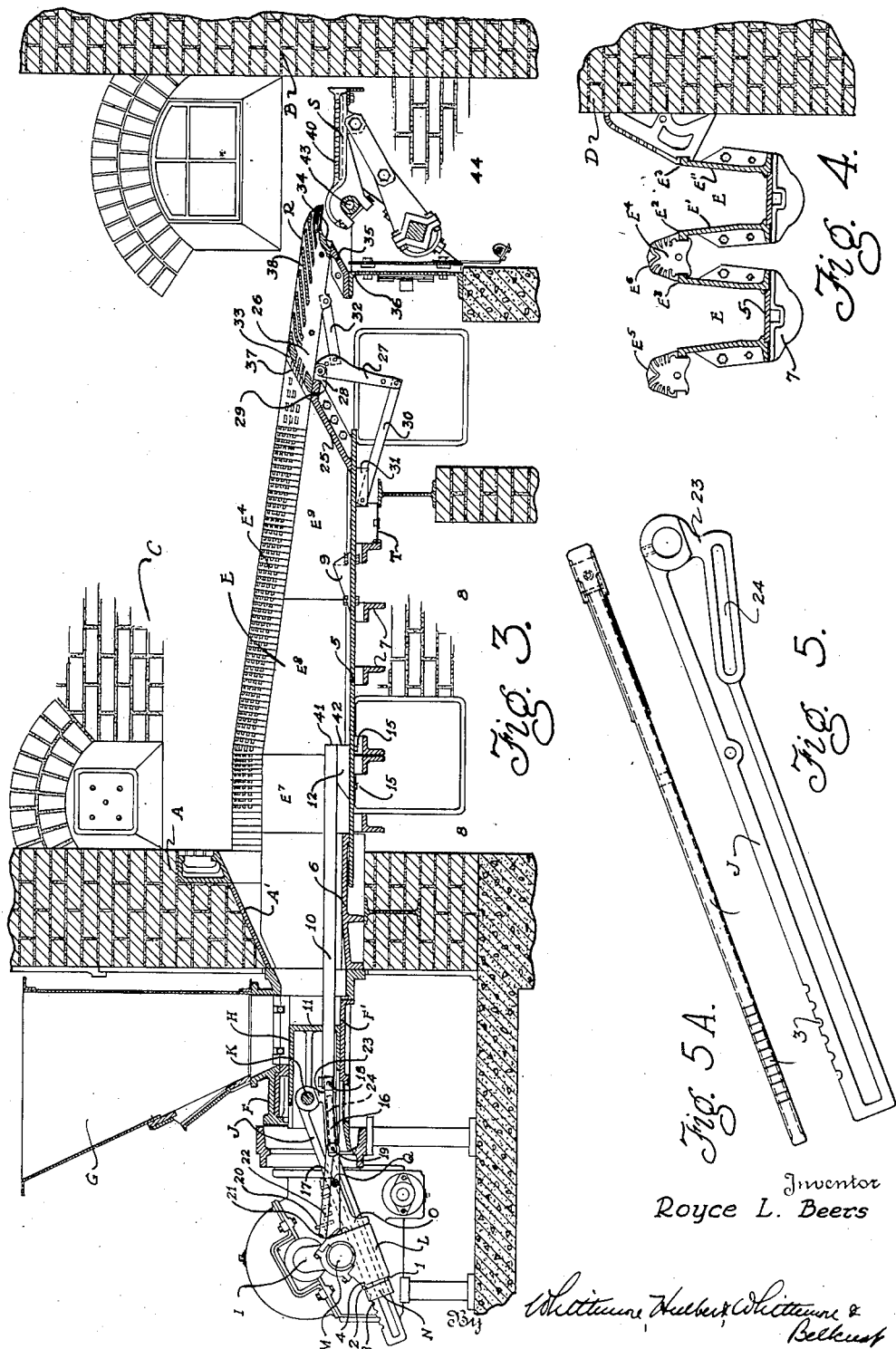

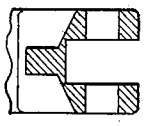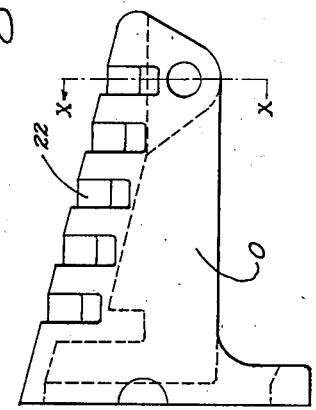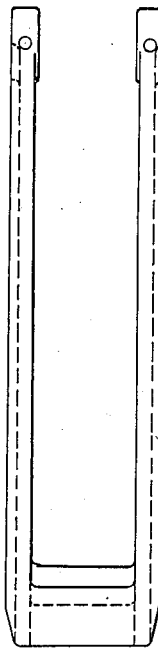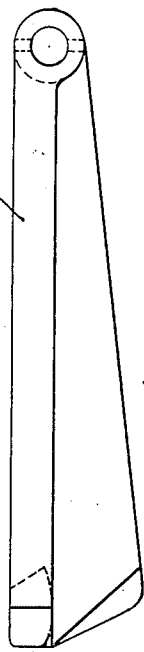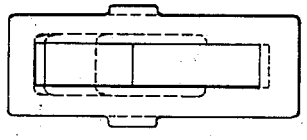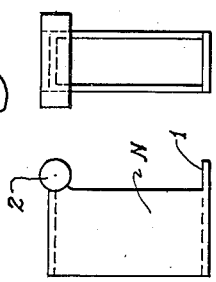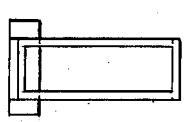

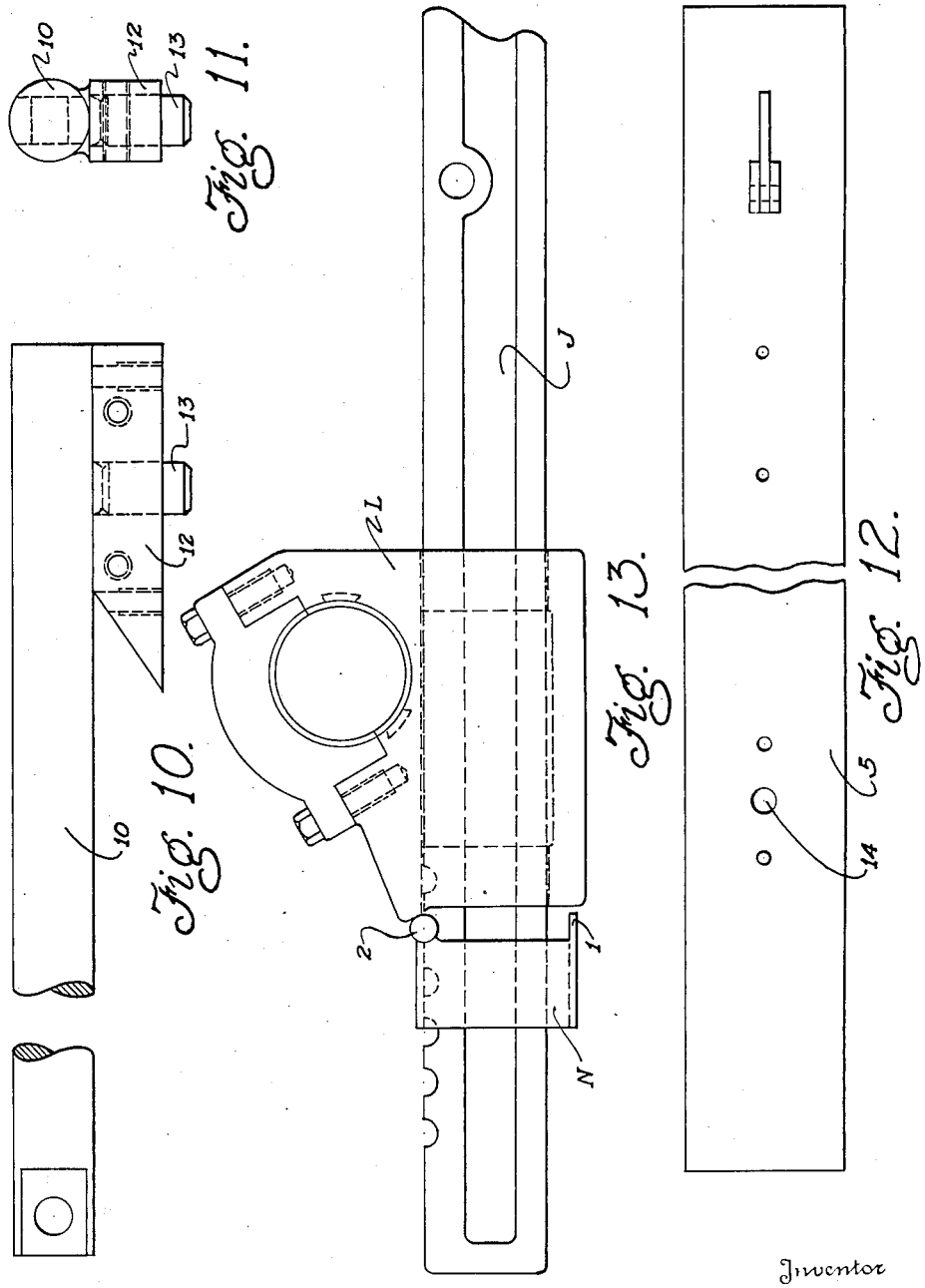

Patented Feb. 5, 1935

1,989,661

UNITED STATES PATENT OFFICE 1,989,661

STOKER MECHANISM

Royce L. Beers, Detroit, Mich., assignor to Detroit Stoker Company, Detroit, Mich., a corporation of Michigan Application July 30, 1932, Serial No. 627,072

14 Claims. (Cl. 110—44)

This invention relates generally to underfeed stokers and consists of certain novel features of construction, combinations and arrangements of parts that will be hereinafter more fully described and particularly pointed out in the appended claims.

In the accompanying drawings:

Figure 3 is a vertical sectional view through the stoker;

Figure 4 is a fragmentary cross sectional view through the stoker;

Figure 5 is a side elevation of one of the pitman rods;

Figure 5A is a top plan view of the pitman rod illustrated in Figure 5.

Figure 6 is a front elevation of one of the shoes on the pitman rod;

Figure 6A is a side elevation of the shoe illustrated in Figure 6.

Figure 6B is a rear elevation of the shoe illustrated in Figure 6.

Figure 7 is a front elevation of the other shoe on the pitman rod;

Figure 7A is a side elevation of the shoe illustrated in Figure 7.

Figure 7B is a vertical sectional view taken on the line X—X in Figure 7A.

Figure 8 is a detail top plan view of the yoke member;

Figure 9 is a detail side elevation of the yoke member;

Figure 10 is a fragmentary side elevation of the pusher bar;

Figure 11 is an end elevation of the pusher bar;

Figure 12 is a top plan view of the movable portion of one of the retorts;

Figure 13 is a fragmentary elevation of a connecting rod, block and shoe assembly.

Figure 14 is a perspective view of the yoke key.

Figures 1, 15:
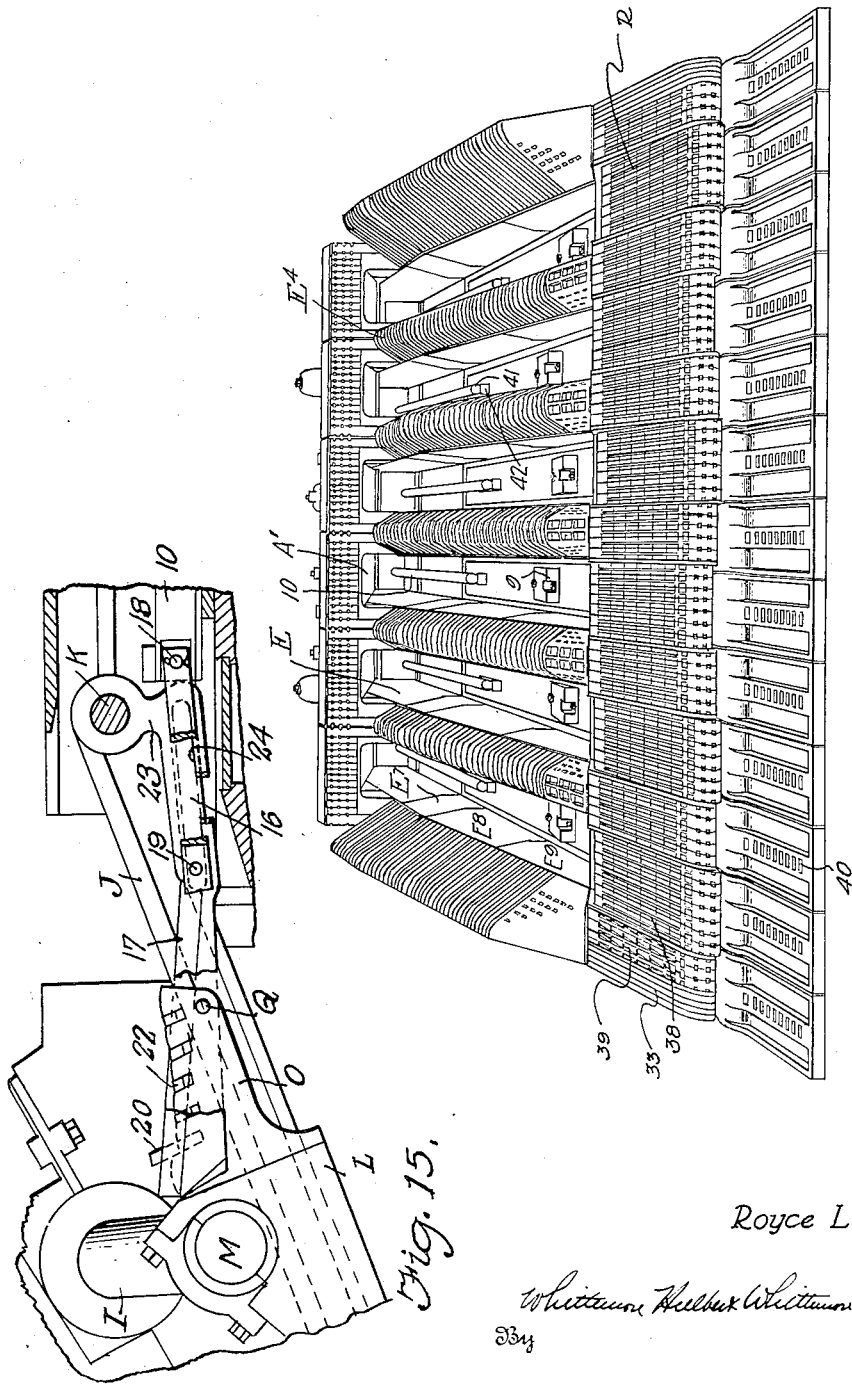
Figure 1 is a perspective view of a stoker embodying my invention.
Figure 15 is a side elevation of the ram and pusher bar actuating mechanism.
Figure 2:
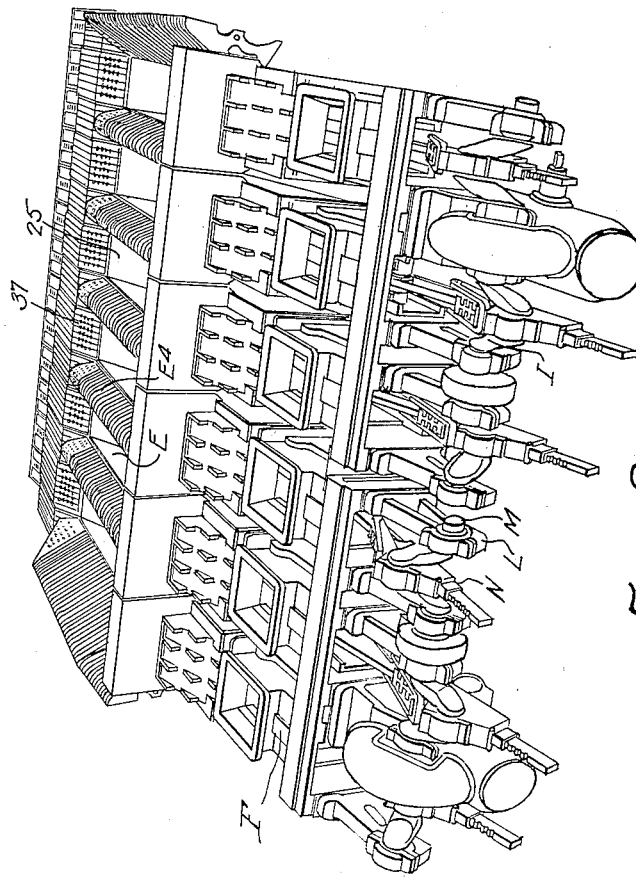
Figure 2 is another perspective view thereof.

Referring now to the drawings, A, B, C and D respectively are the front, rear and side walls of a furnace. E are a plurality of substantially trough-shaped retorts extending through and projecting rearwardly from the front wall A, and F are ram cases in front of the wall A and having their rear ends opening into and secured to the forward ends of the retorts. G are hoppers for the green fuel mounted upon and discharging into the cases F, and H are rams in the cases for feeding the fuel from the hoppers into the retorts. I is a crank shaft journaled in suitable bearings in front of the cases F; J are pitman rods connected by pins K to the rams H and extending forwardly therefrom below and beyond the shaft I; L are blocks carried by the crank portions M of the shaft and slidably mounted on the pitman rods J; and N and O respectively are shoes on the rods J at opposite ends of and constituting abutments for the blocks L. Preferably the shoes O are connected to the pitman rods J by shear pins Q while the shoes N are adjustably mounted on the rods J and are provided at their upper and lower rear edges with transversely extending rearwardly projecting portions 1 and 2 respectively for engagement with the forward ends of the blocks L. Preferably the portions 1 are flat and constitute spacers between the shoes N and blocks L, while the portions 2 are engageable with longitudinally spaced transversely extending openings 3 of semi-circular cross section in the upper edges of the pitman rods J. To provide pressure upon these portions 2 so that they will remain in the proper openings 3 after the shoes N are adjusted, the forward ends of the blocks L are provided at their upper edges with transversely extending forwardly projecting cam portions 4 that overlap and bear downwardly and inwardly against the portions 2.

In the present instance portions 5 of the bottom walls 6 of the retorts are mounted to reciprocate upon suitable cross bars 7 at the top of the wind chamber 8 and carry pusher blocks 9 for advancing the fuel longitudinally of the retorts. Preferably such portions 5 are actuated by the pitman rods J without being connected to or driven by the rams H. As shown, this has been accomplished by the provision of pusher bars 10 that extend through the front walls 11 of the rams and are terminally connected to the portions 5 and to the pitman rods J. Preferably the connections between the bars 10 and portions 5 comprise the blocks 12 welded to the bars 10 at the rear ends thereof, dowel pins 13 projecting downwardly from the blocks 12 and engaging circular openings 14 in the portions 5, and bolts 15 fore and aft of the dowel pins, while the connections between the bars 10 and rods J comprise links 16, yokes 17, connecting pins 18 and 19 and keys 20. As shown, the links 16 are terminally connected by the pins 18 and 19 to the bars 10 and yokes 17, while the latter straddle the shoes O so that the bases 21 of the yokes will be engaged by the keys 20 upon the forward strokes of the pitman rods J. In this connection it will be noted that the keys 20 are substantially U-shaped and are detachably engageable with spaced openings 22 arranged in stepped relation in the upper faces of the shoes O. It will also be noted that the pitman rods J are provided at their rear ends with depending portions 23 having slots 24 therein receiving the pins 19 and the forward ends of the bars 10 are in line with and adapted to be engaged by said portions 23 on the rearward strokes of the pitman rods. Thus with this construction the forward movements of the pitman rods J are under the control of the shoes N, while the rearward movements of the pusher bars 10 and portions 5 are under the independent control of the keys 20. Both the shoes N and keys 20 are in front of the furnace and readily accessible, hence the adjustments desired may be easily and quickly made.

In the present instance, the reciprocating portions 5 of the retorts slide beneath the lower ends of the upwardly and rearwardly inclined end walls 25 of the retorts and are connected to movable sections 26 of an extension or overfeed grate R. Preferably these sections 26 are in line with and are operatively connected to the reciprocating portions 5 of the retorts so that such sections will move in unison with such portions. As shown, the connections between the sections 26 and portions 5 comprise levers 27 pivotally connected to and extending downwardly from portions 28 of rearwardly extending flanges 29 at the upper ends of the end walls 25, links 30 terminally connected to depending vertical webs 31 of the portions 5 and to the lower ends of the levers 27, and links 32 terminally connected to the levers 27 adjacent their upper ends and to the sections 26 intermediate their ends. In this connection it will be noted that the construction and arrangement of levers 27 and links 32 are such that the motion from the retort bottom sections 5 to the grate sections 26 is reduced. The stationary sections 33 are alternately arranged with the movable sections 26 so that collectively such sections 26 and 33 extend across the entire width of the furnace. Preferably the sections 26 and 33 are substantially the same in configuration and are mounted on the flanges 29 and upon the upper edges 34 of brackets 35 fixed to the cross bar 36. The forward ends 37 of the sections 26 and 33 incline upwardly and rearwardly so as to constitute extensions of the end walls 25 while the construction and arrangement of the sections 26 and 33 and brackets 35 are such that the ignited fuel issuing from the retorts E will move downwardly and rearwardly onto pivotally mounted dump plates S below and at the rear of the extension grate R. In order that the fuel on the grate R will be supplied with air to assist in the last stages of combustion, I have provided a slidably mounted damper T at the rear end of the wind chamber 8 to control the flow of air from said chamber to the openings 38 and 39 respectively in the grate sections 26 and 33. To further assist in the consumption of fuel I have provided openings 40 for air in the dump plates S.

As shown in Figure 3, the bottom wall portions 5 and 6 respectively of the retorts are horizontal and substantially in alignment with the bottom walls F' of the ram cases F, while the side walls E' and E'' of said retorts are substantially parallel but have horizontal and inclined upper longitudinal edges E$^2$ and E$^3$ respectively. Tuyère blocks E$^4$ bridge the spaces between the retorts and rest on the edges E$^2$ and E$^3$ throughout the length of the retorts. Consequently such blocks when assembled provide horizontal and inclined surfaces E$^5$ and E$^6$ respectively for the fuel. Preferably each retort comprises three trough-shaped sections E$^7$, E$^8$, and E$^9$ respectively arranged end to end. The sections E$^8$ and E$^9$ constitute the main part of the retort and the combined length thereof preferably remains standard while the sections E$^7$ are supplemental to the sections E$^8$ and E$^9$ and the length thereof is variable according to the overall length of stoker desired. Usually the front wall openings A' are at a standard height, consequently it would be impractical to use the sections E$^8$ and E$^9$ of standard length in furnaces of different length. Moreover, it would be impractical to use additional sections having inclined edges forming continuations of the inclined edges E$^3$ for the forward ends of such inclined edges would be too high relative to the wall openings A'. Thus it would be necessary to make many changes to the parts to build in stokers of different lengths. However, all of these difficulties have been overcome in my construction by the use of the horizontal sections E$^7$. As shown, such sections are in horizontal alignment with the openings A' and constitute a proper forward continuation of the sections E$^8$ and E$^9$. As a result the sections E$^8$ and E$^9$ of standard length may be used in furnaces of different length without having to make any changes or alterations, and the tuyère blocks E$^4$ are disposed at the proper height and in the proper position for the fuel.

Thus from the foregoing it will be readily apparent that I have provided an extremely efficient construction wherein provision is made for driving the pusher bars 10, retort bottom portions 5 and movable grate sections 26 in unison from the connecting rods J and independently of the rams H. Consequently distortion or misalignment of the rams H by reason of pusher bar driving connections has been dispensed with entirely. Moreover, the driving connections between the pitman rods J and pusher bars 10, etc., may be adjusted so that the throw of the pusher bars 10 may be varied independently of and relative to the throw of the rams H. However, the connections between the shaft I and pitman rods J are such that the throw of the rams H and the throw of the pusher bars 10, etc., may be correspondingly varied. It will also be noted that the drive from the shaft I to the rams H and from the pitman rods J to the pusher bars 10 includes the shoes O and shearable pins Q. Thus a safety feature common to both drives is provided. The connections between the pusher bars 10 and retort bottom portions 5 include the relatively heavy dowel pins 13, hence undue strain upon bolts 15 fore and aft of the pins is prevented. Moreover, the rear ends 41 and 42 respectively of the bars 10 and blocks 12 constitute abutments for the fuel and cooperate with the blocks 9 to move the fuel longitudinally of the retorts. The extension grate R and dump plates S arranged in rear of the retorts E receive the fuel after issuing from the retorts and are provided with sufficient openings for air to insure proper consumption of the fuel. The movable sections 26 assist in the movement of the fuel from the retorts E to the dump plates S and the latter may be readily swung about the pivot member 43 so that the material upon the plates may be dumped into the ash chamber 44 of the furnace.

What I claim as my invention is:

1. In a stoker, the combination with a retort, a ram for feeding fuel into the retort, and a pusher bar for moving fuel within the retort, of actuating means for the pusher bar including a pitman rod for the ram having a portion adjacent the ram entirely free from but engageable with the pusher bar to actuate the same.

2. In a stoker, the combination with a retort, and a ram for feeding fuel into the retort, of actuating means for the ram including a pitman rod connected directly to the ram, and a pusher bar within the retort having a lost motion connection with said pitman rod at a point remote to the ram and having a driving engagement with the rod at a point adjacent the connection between the rod and ram.

3. In a stoker, a reciprocating member, a ram operable by said member, a rotary shaft, a driving connection between said rotary shaft and reciprocating member including a shearable pin, a pusher bar, and a driving connection between the member and bar including a projection on the member entirely free from but engageable with said bar.

4. In a stoker, a trough-shaped retort having overlapping fixed and movable bottom wall sections, a ram for feeding fuel into the retort, a drive member, a connection between said member and ram, and a driving connection between said member and the movable bottom wall section of the retort including a fuel pusher bar movable over the fixed bottom wall section of the retort.

5. In a stoker, an elongated retort having fixed and movable bottom wall sections, one constituting an end extension of the other, a ram for feeding fuel into the retort, a drive member, a connection between said member and ram, and a driving connection between said member and movable bottom wall section including a fuel pusher bar movable longitudinally of the fixed section aforesaid.

6. In a stoker, a retort having fixed and movable bottom wall sections, one constituting an end extension of the other, a fuel pusher bar within and movable longitudinally of the fixed section, and a driving connection between said bar and movable section.

7. In a stoker, a retort having fixed and movable bottom wall sections, one constituting an end extension of the other, and actuating means for said movable section including a pusher bar movable longitudinally of the fixed section and having a portion for moving fuel longitudinally of the retort.

8. In a stoker, a retort having fixed and movable bottom wall sections, one constituting an end extension of the other, and actuating means for said movable section including a reciprocating pusher bar movable longitudinally of the fixed section and bolted to said movable section, and means for relieving the bolts of strain including a member extending between the bar and movable section.

9. In a stoker, a rotary shaft, a ram, a fuel pusher bar, and a driving connection between the shaft and bar including a pitman rod for the ram having a portion entirely free of and abutting the rear end of the bar.

10. In a stoker, a fuel pusher bar, and actuating means therefor including a reciprocating member abutting the bar, a shoe carried by said member, and a yoke connected to the bar and having a lost motion connection with the shoe.

11. In a stoker, a trough-shaped retort for the fuel having a movable bottom wall and a fixed rear wall, an ash receiver in rear of said rear wall, an extension grate between said rear wall and ash receiver, means for moving the bottom wall including fuel pusher means within said retort, and means for moving the grate in timed relation to said bottom wall including means actuable by said movable bottom wall.

12. In a stoker, a trough-shaped retort having a fixed upwardly and rearwardly inclined rear wall and a bottom wall mounted to slide beneath said rear wall, a grate mounted to slide above the rear wall as a rearward extension thereof, means for actuating the bottom wall including means within and movable longitudinally of said retort, and a driving connecton between the bottom wall and grate including a lever carried by the fixed rear wall, and links extending from said lever to said bottom wall and grate respectively.

13. In a stoker, the combination with a retort, a ram for feeding fuel into said retort, a pitman rod for driving said ram, and a pusher bar for moving fuel within said retort, of a freely separable direct drive between the pitman rod and pusher bar operable upon fuel feeding movement of the ram to move the pusher bar in one direction, and an indirect adjustable lost motion drive between the pitman rod and pusher bar operable upon the return stroke of the ram to move the pusher bar in the opposite direction.

14. In a stoker, the combination with a retort, a ram for feeding fuel into said retort, a pitman rod for driving the ram, and a pusher bar for moving fuel within said retort, of a freely separable direct drive between the pitman rod and pusher bar operable upon movement of the ram in one direction to push the pusher bar, and an indirect adjustable lost motion drive between the pitman rod and pusher bar operable upon movement of the ram in the opposite direction to pull the pusher bar.

ROYCE L. BEERS.